United States Patent
Kakas et al.

(10) Patent No.: US 12,116,051 B2
(45) Date of Patent: Oct. 15, 2024

(54) DEGRADATION CONCEPT FOR A STEER-BY-WIRE STEERING SYSTEM

(71) Applicants: thyssenkrupp Presta AG, Eschen (LI); Honda Motor Co., Ltd., Tokyo (JP)

(72) Inventors: Pèter Kakas, Budapest (HU); Yosuke Ojima, Wako (JP); Yuya Tanno, Wako (JP); Takaya Yamaguchi, Wako (JP); Munetsugu Hanji, Wako (JP)

(73) Assignees: THYSSENKRUPP PRESTA AG, Eschen (LI); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/969,007

(22) Filed: Oct. 19, 2022

(65) Prior Publication Data

US 2023/0040044 A1 Feb. 9, 2023

Related U.S. Application Data

(63) Continuation of application No. PCT/EP2020/061017, filed on Apr. 20, 2020.

(51) Int. Cl.
*B62D 5/04* (2006.01)

(52) U.S. Cl.
CPC ................. *B62D 5/0484* (2013.01)

(58) Field of Classification Search
CPC .... B62D 5/0484; B62D 5/003; B62D 15/025; B62D 5/0481; B62D 15/0285; B62D 5/001
See application file for complete search history.

(56) References Cited

U.S. PATENT DOCUMENTS

| 1,457,173 A | * | 5/1923 | Kageyama | B60Q 1/34 340/815.55 |
| 3,917,014 A | * | 11/1975 | Ward | B62D 11/183 60/484 |

(Continued)

FOREIGN PATENT DOCUMENTS

| CN | 207292035 U | * | 5/2018 | |
| CN | 109229199 A | * | 1/2019 | ............. B62D 1/166 |

(Continued)

OTHER PUBLICATIONS

"Recent Developments in the Vehicle Steer-by-Wire System;" Mortazavizadeh et al., IEEE Transactions on Transportation Electrification (vol. 6, Issue: 3, pp. 1226-1235); Sep. 1, 2020. (Year: 2020).*

(Continued)

*Primary Examiner* — Stephen Holwerda
*Assistant Examiner* — Jorge O Peche
(74) *Attorney, Agent, or Firm* — Keating & Bennett, LLP

(57) ABSTRACT

A steer-by-wire steering system for a motor vehicle or a steering system for an autonomous driving motor vehicle includes a controller configured or programmed to control steering of steerable road wheels depending on a driver's input or an input of an autonomous driving unit and to include a normal mode of operation with full steering functionality and no quality problems, and at least two degraded modes with degraded operation of the steering system. The steering system includes an evaluator to evaluate a state of performance degradation of the steering system and to set the operation mode of the controller based on an evaluation result from the evaluator.

23 Claims, 1 Drawing Sheet

(56) References Cited

U.S. PATENT DOCUMENTS

| | | | | |
|---|---|---|---|---|
| 4,202,611 A * | 5/1980 | Parker | G03B 21/43 | 340/12.54 |
| 4,218,115 A * | 8/1980 | Parker | G03B 21/43 | 352/7 |
| 5,404,960 A * | 4/1995 | Wada | B62D 5/0466 | 701/41 |
| 5,829,547 A * | 11/1998 | Fujii | B62D 5/065 | 180/422 |
| 6,054,827 A * | 4/2000 | Takatsuka | B62D 5/0484 | 318/432 |
| 6,163,277 A * | 12/2000 | Gehlot | G08G 1/09675 | 340/936 |
| 6,178,365 B1 * | 1/2001 | Kawagoe | B62D 1/286 | 701/1 |
| 6,213,246 B1 * | 4/2001 | Bohner | B62D 5/003 | 180/406 |
| 6,448,728 B2 * | 9/2002 | Noro | B62D 5/0484 | 180/443 |
| 8,140,280 B2 * | 3/2012 | Kasai | B62D 5/0481 | 702/182 |
| 8,762,006 B2 * | 6/2014 | Miller | B62D 5/049 | 180/402 |
| 9,104,537 B1 * | 8/2015 | Penilla | G06Q 10/20 | |
| 10,692,377 B1 * | 6/2020 | Kentley-Klay | G05D 1/0011 | |
| 11,132,916 B2 * | 9/2021 | Deakins | G09B 9/052 | |
| 11,220,273 B2 * | 1/2022 | Ochida | B60W 60/00186 | |
| 11,673,582 B1 * | 6/2023 | Zhang | B60W 40/13 | 701/23 |
| 2001/0023383 A1 * | 9/2001 | Ishihara | H02M 7/53873 | 180/443 |
| 2003/0060968 A1 * | 3/2003 | MacPhail | G08G 1/0104 | 701/117 |
| 2003/0098197 A1 * | 5/2003 | Laurent | H02K 7/06 | 180/401 |
| 2004/0007416 A1 * | 1/2004 | Furumi | B62D 5/046 | 180/443 |
| 2004/0128042 A1 * | 7/2004 | Takahashi | B62D 5/0403 | 180/443 |
| 2004/0140147 A1 * | 7/2004 | Laurent | B62D 5/003 | 180/402 |
| 2005/0045413 A1 * | 3/2005 | Shitamitsu | B62D 5/0409 | 180/402 |
| 2005/0072621 A1 * | 4/2005 | Hara | B62D 1/163 | 180/444 |
| 2005/0150712 A1 * | 7/2005 | Tokumoto | B62D 6/10 | 180/443 |
| 2005/0173183 A1 * | 8/2005 | Chikaraishi | F16H 57/0412 | 180/444 |
| 2005/0203705 A1 * | 9/2005 | Izumi | B62D 5/008 | 340/436 |
| 2006/0042859 A1 * | 3/2006 | Itoh | B62D 5/003 | 180/402 |
| 2007/0156310 A1 * | 7/2007 | Hirano | B60T 8/885 | 701/31.8 |
| 2008/0306655 A1 * | 12/2008 | Ukai | B62D 5/0463 | 701/41 |
| 2009/0050397 A1 * | 2/2009 | Onuma | B62D 5/001 | 180/402 |
| 2009/0150027 A1 * | 6/2009 | Takamatsu | B62D 5/0457 | 701/41 |
| 2010/0006360 A1 * | 1/2010 | Kishimoto | B60K 6/547 | 180/65.21 |
| 2010/0051377 A1 * | 3/2010 | Sugitani | B62D 7/18 | 180/443 |
| 2010/0274435 A1 * | 10/2010 | Kondoh | B60W 40/09 | 701/31.4 |
| 2010/0332050 A1 * | 12/2010 | Kobayashi | B62D 15/025 | 701/1 |
| 2011/0036660 A1 * | 2/2011 | Kojo | B62D 6/002 | 180/446 |
| 2011/0054742 A1 * | 3/2011 | Yamashita | B62D 5/0463 | 701/41 |
| 2011/0066331 A1 * | 3/2011 | Yamashita | B62D 5/0481 | 701/42 |
| 2011/0257845 A1 * | 10/2011 | Niki | B62D 5/0472 | 701/41 |
| 2011/0264329 A1 * | 10/2011 | Limpibunterng | B62D 5/0472 | 701/41 |
| 2012/0109410 A1 * | 5/2012 | Hanzawa | B60W 30/02 | 701/1 |
| 2012/0305328 A1 * | 12/2012 | Rombold | B62D 5/003 | 180/442 |
| 2013/0145482 A1 * | 6/2013 | Ricci | G06Q 30/0265 | 726/28 |
| 2013/0166159 A1 * | 6/2013 | Kondoh | B60K 28/066 | 701/1 |
| 2013/0187574 A1 * | 7/2013 | Sakaguchi | B60R 16/0232 | 318/139 |
| 2013/0190988 A1 * | 7/2013 | Limpibunterng | B62D 15/025 | 701/42 |
| 2013/0197713 A1 * | 8/2013 | Yoshihama | B62D 15/021 | 701/1 |
| 2013/0218403 A1 * | 8/2013 | Abe | B62D 5/0481 | 701/32.8 |
| 2013/0226408 A1 * | 8/2013 | Fung | G08G 1/166 | 701/1 |
| 2013/0253766 A1 * | 9/2013 | Kimura | B62D 5/0484 | 701/41 |
| 2013/0304327 A1 * | 11/2013 | Morishita | B62D 5/049 | 701/43 |
| 2013/0320893 A1 * | 12/2013 | Aoki | B62D 5/049 | 318/400.18 |
| 2014/0019008 A1 * | 1/2014 | Nakamura | B62D 6/008 | 701/42 |
| 2014/0039722 A1 * | 2/2014 | Kondoh | B60W 40/09 | 701/1 |
| 2014/0257639 A1 * | 9/2014 | Chandy | B62D 5/0484 | 701/41 |
| 2015/0120144 A1 * | 4/2015 | De Bruin | B60W 10/04 | 701/41 |
| 2015/0151757 A1 * | 6/2015 | De Bruin | B60W 60/0053 | 701/41 |
| 2015/0166066 A1 * | 6/2015 | Suzuki | B62D 5/0481 | 477/174 |
| 2015/0175193 A1 * | 6/2015 | Endo | B62D 5/0481 | 701/29.2 |
| 2015/0274201 A1 * | 10/2015 | Kunihiro | B62D 15/025 | 701/41 |
| 2015/0336606 A1 * | 11/2015 | Shibuya | B62D 5/001 | 180/444 |
| 2015/0336607 A1 * | 11/2015 | Inoue | B60W 30/10 | 701/41 |
| 2015/0353128 A1 * | 12/2015 | Shibuya | B62D 5/001 | 701/41 |
| 2016/0200349 A1 * | 7/2016 | Whitaker, Jr. | B62D 5/008 | 180/421 |
| 2016/0200355 A1 * | 7/2016 | Mori | H02P 21/22 | 180/446 |
| 2017/0076395 A1 * | 3/2017 | Sedlik | G08G 1/012 | |
| 2017/0259846 A1 * | 9/2017 | Koseki | H02P 29/68 | |
| 2018/0037260 A1 * | 2/2018 | Otake | G05D 1/0212 | |
| 2018/0056986 A1 * | 3/2018 | Wang | B60W 30/18145 | |
| 2018/0057048 A1 * | 3/2018 | Joyce | B62D 5/0484 | |
| 2018/0113452 A1 * | 4/2018 | Wiechers | F41H 13/0018 | |
| 2018/0162390 A1 * | 6/2018 | Miura | B62D 6/00 | |
| 2018/0229738 A1 * | 8/2018 | Nilsson | B60T 7/12 | |
| 2019/0382045 A1 * | 12/2019 | Sachs | G07C 5/085 | |
| 2019/0389510 A1 * | 12/2019 | Ogawa | B62D 6/10 | |
| 2020/0070879 A1 * | 3/2020 | Kim | B62D 6/002 | |
| 2020/0172153 A1 * | 6/2020 | Kawamura | B62D 5/0403 | |
| 2021/0061356 A1 * | 3/2021 | Kasai | B62D 15/025 | |
| 2021/0139015 A1 * | 5/2021 | Dakemoto | B60T 8/1755 | |
| 2021/0276556 A1 * | 9/2021 | Hansen | B60L 58/18 | |
| 2022/0289277 A1 * | 9/2022 | Narasimhan | B62D 5/0484 | |
| 2022/0289283 A1 * | 9/2022 | Narasimhan | B62D 6/008 | |
| 2022/0315020 A1 * | 10/2022 | Tagesson | B60W 10/20 | |
| 2022/0315100 A1 * | 10/2022 | Shimizu | B60W 50/029 | |
| 2022/0388504 A1 * | 12/2022 | Lee | B60W 10/20 | |

(56) References Cited

U.S. PATENT DOCUMENTS

| | | | | |
|---|---|---|---|---|
| 2023/0124821 | A1* | 4/2023 | Labarbera | B62D 9/005 701/41 |
| 2023/0227101 | A1* | 7/2023 | Ojima | B62D 6/002 180/402 |
| 2024/0246602 | A1* | 7/2024 | Arányi | B62D 5/0484 |

FOREIGN PATENT DOCUMENTS

| | | | | |
|---|---|---|---|---|
| CN | 108082073 | B * | 7/2022 | B60G 17/015 |
| CN | 117698691 | A * | 3/2024 | B60W 10/184 |
| DE | 19833460 | A1 * | 1/2000 | B62D 5/001 |
| DE | 102021205875 | A1 * | 12/2022 | |
| EP | 1308377 | A1 * | 5/2003 | B60T 11/21 |
| EP | 1314628 | A1 * | 5/2003 | B62D 5/003 |
| EP | 1616746 | A2 * | 1/2006 | B60K 6/46 |
| EP | 3042827 | A2 * | 7/2016 | B62D 1/166 |
| ES | 2291411 | T3 * | 3/2008 | B62D 5/003 |
| JP | H06321087 | A * | 11/1994 | |
| JP | H10316000 | A * | 12/1998 | |
| JP | 2000043749 | A * | 2/2000 | B62D 5/001 |
| JP | 2007245821 | A * | 9/2007 | |
| JP | 2010154584 | A * | 7/2010 | |
| JP | 2017001562 | A * | 1/2017 | |
| JP | 2019051894 | A * | 4/2019 | |
| JP | 2020192936 | A * | 12/2020 | |
| WO | WO-2004005096 | A1 * | 1/2004 | B60G 17/0185 |
| WO | WO-2009123113 | A1 * | 10/2009 | B62D 5/046 |
| WO | WO-2011105154 | A1 * | 9/2011 | B62D 5/0463 |
| WO | WO-2015040960 | A1 * | 3/2015 | B62D 5/04 |
| WO | WO-2020173122 | A1 * | 9/2020 | |
| WO | WO-2020244909 | A1 * | 12/2020 | B62D 5/003 |
| WO | WO-2021213618 | A1 * | 10/2021 | B62D 15/025 |
| WO | WO-2023046268 | A1 * | 3/2023 | B62D 5/0481 |
| WO | WO-2023046271 | A1 * | 3/2023 | B62D 5/0481 |

OTHER PUBLICATIONS

"A hardware-in-the-loop and virtual reality test environment for steer-by-wire system evaluations;" Setlur et al., Proceedings of the 2003 American Control Conference, 2003. (vol. 3, pp. 2584-2589 vol. 3); Jan. 1, 2003. (Year: 2003).*

"Actuator and sensor fault tolerant control for Steer-by-Wire systems: Recent Advances;" Huang et al., 2022 China Automation Congress (CAC) (pp. 1606-1610); 2022-11-25. (Year: 2022).*

Official Communication issued in International Patent Application No. PCT/EP2020/061017, mailed on Jan. 12, 2021.

Official Communication issued in International Patent Application No. PCT/EP2020/061017, issued on Oct. 25, 2022.

* cited by examiner

DEGRADATION CONCEPT FOR A STEER-BY-WIRE STEERING SYSTEM

CROSS REFERENCE TO RELATED APPLICATIONS

This application claims the benefit of priority to PCT Application No. PCT/EP2020/061017 filed on Apr. 20, 2020. The entire contents of each application are hereby incorporated herein by reference.

BACKGROUND OF THE INVENTION

1. Field of the Invention

The present invention relates to a steer-by-wire steering system for a motor vehicle or a steering system for an autonomous driving motor vehicle.

2. Description of the Related Art

In motor vehicles with electromechanical steering systems, degradation is possible and allowed. For safety critical steering systems of autonomous vehicles and/or steer-by-wire systems, the requirements and the architecture is different. One of the main requirements is that the steering system has to be fault tolerant, which means that if one failure occurs, the steering system has to operate further, providing the main functionality.

SUMMARY OF THE INVENTION

Preferred embodiments of the present invention provide steer-by-wire steering systems for motor vehicles and steering systems for autonomous driving motor vehicles, each of which enables control of a trajectory of a vehicle even after degradation has occurred to avoid safety critical situations.

Accordingly, a steer-by-wire steering system for a motor vehicle or a steering system for an autonomous driving motor vehicle including a controller is provided, wherein the controller is configured or programmed to control steering of steerable road wheels depending on a driver's input or an input of an autonomous driving unit, and to include a normal mode of operation with full steering functionality and no quality problems, and at least two degraded modes with degraded operation of the steering system. The steering system includes an evaluator to evaluate a state of performance degradation of the steering system and to set the operation mode of the controller based on an evaluation result from the evaluator.

This degradation concept can be used in steering systems where the existence of the system operation is safety critical. Preferably, the steering system is fault tolerant. If the steering system is not fault tolerant but the probability of the first fault is an acceptably low value, this concept can also be used in such steering systems.

Even after a certain loss of available performance of the steering system, the driver or the vehicle is able to control the trajectory in a safe way. Thus, safety critical situations can be avoided.

Preferably, the operation modes are each defined by ranges limited by performance limit values of the steering system. Examples of range-selections are given below.

In a preferred embodiment, a normal mode of operation may be in a range between 100% of available performance of the steering system and a first lower limit, which is in a range between about 90% and about 99% of available performance of the steering system, preferably around about 95% of available performance of the steering system.

It is preferred that a first of the at last two degraded modes is in a range between a first upper limit and a second lower limit, wherein the first upper limit is in a range between about 90% and about 99% of available performance of the steering system and the second lower limit is in a range between about 60% and about 90% of available performance of the steering system, for example. The first upper limit is advantageously about 95% of available performance of the steering system and/or the second lower limit is advantageously about 70% of available performance of the steering system, for example.

The first degraded mode provides preferably full steering functionality. Quality issues may occur.

Further, it is preferred if a second of the at last two degraded modes is in a range between a second upper limit and a third lower limit, wherein the second upper limit is in a range between about 60% and about 90% of available performance of the steering system and the third lower limit is in a range between about 30% and about 70% of available performance of the steering system, for example.

Preferably, the second upper limit is about 70% of available performance of the steering system and/or the third lower limit is about 50% of available performance of the steering system, for example.

The second degraded mode provides preferably full steering functionality, wherein the controller of the steering system provides a speed limit to a vehicle drive controller, wherein the speed limit is in a range that has been set in advance.

Further, there can be a third of the at last two degraded modes, which lies preferably in a range between a third upper limit and zero available performance of the steering system, wherein the third upper limit is in a range between about 30% and about 70% of available performance of the steering system, in particular around about 50% of available performance of the steering system, for example.

The third degraded mode provides preferably no steering functionality, wherein the controller of the steering system provides a speed limit to a vehicle drive controller, wherein the speed limit is in a range that has been set in advance.

It is possible to include only three of the afore-mentioned modes into the degradation concept. However, it is advantageous if the controller has in total four modes of operation and the first lower limit equals the first upper limit, the second lower limit equals the second upper limit and the third lower limit equals the third upper limit.

It is preferred that the controller of the steering system is designed to send its status to an information output, which is capable of notifying the driver of a degraded operation. The notification can be specific for each degradation mode. The information output controls preferably at least one notifier that may be a vehicle display, a vehicle speaker or steering wheel, which can vibrate to provide notification or which can be implemented as a notifier by modifying a virtual gear ratio of a steer-by-wire steering system or by increasing the feedback given by a feedback actuator of a steer-by-wire steering system or by reducing the assist force in (Electric Power Assisted Steering (EPAS) systems. It is also possible that more than one of the notifiers are used to notify the driver of the degradation of the steering system.

Further, a method of controlling a steer-by-wire steering system for a motor vehicle or a steering system for an autonomous driving motor vehicle is provided, wherein the steering system includes the afore-mentioned controller configured or programmed to control steering of steerable road wheels depending on a driver's input or an input of an autonomous driving unit, the controller is configured or programmed to include a normal mode of operation with full steering functionality and no quality problems and at least two degraded modes with degraded operation of the steering system, wherein the method includes evaluating a state of performance degradation of the steering system by evaluation, and setting the controller to a normal mode or to one of the at least two degraded modes based on an evaluation result.

Preferably, the at least two degraded modes include one degraded mode with enough performance of the steering system to finish all the steering maneuvers and one degraded mode where the performance of the steering system is too low to finish the steering maneuvers and a vehicle speed limitation is used.

The operation modes are each preferably defined by ranges limited by performance limit values of the steering system. The limit values and the characteristic of the modes of operation are as described above.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
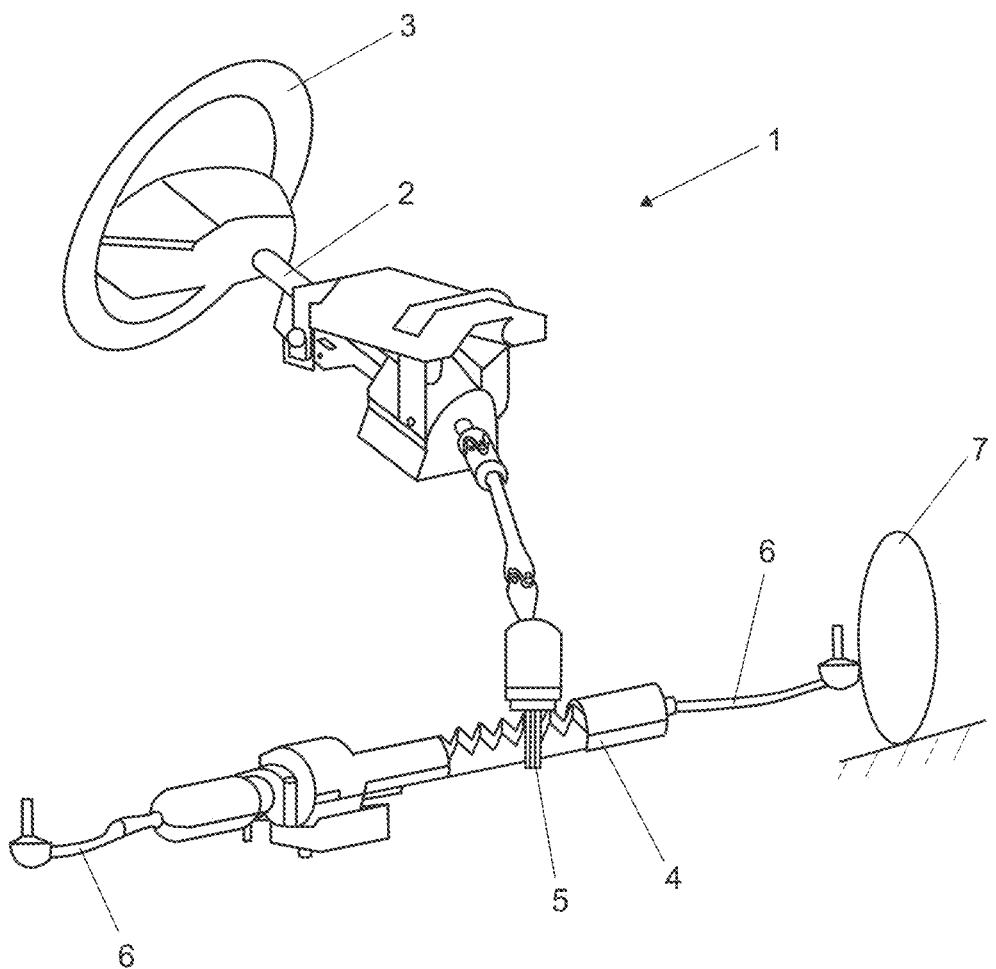
FIG. 1 is a schematic view of a electromechanical steering system.

FIG. 1 shows a schematic drawing of an electromechanical power steering mechanism 1. A steering shaft 2 is connected to a steering wheel 3 for operation by the driver. The steering shaft 2 is coupled to a steering rack 4 via a gear pinion 5. Steering rack rods 6 are connected to the steering rack 4 and to steered wheels 7 of the motor vehicle. A rotation of the steering shaft 2 causes an axial displacement of the steering rack 4 via the gear pinion 5 which is connected to the steering shaft 2 in a torque-proof manner. An assist force is applied to the steering mechanism by driving an electric motor. The electromechanical power steering mechanism 1 can be a column assist, rack assist, or pinion assist type. Column assist EPAS systems include an electric motor connected to the steering column 2. Rack assist EPAS systems include an electric motor that is connected to the steering rack 4. Pinion assist EPAS systems include an electric motor connected to the pinion 5. FIG. 1 shows all three assist types of which usually only one is implemented. The EPAS system is usable in an autonomously steered road vehicle. The vehicle can be fully autonomous or it can offer an autonomous mode, e.g., for parking or long distance travelling. Such an EPAS system has to have high safety measures and are therefore safety critical.

Safety critical steering systems also include steer-by-wire systems, where there is no mechanical connection between the steering wheel and the steerable wheels. Further, there can be no mechanical coupling for synchronizing the steering between the steerable wheels themselves.

These safety critical steering systems all include a controller which is configured or programmed to include four modes of operation, a normal mode (AB) and three degraded modes (BC, CD, DE). An evaluator evaluates the state of performance degradation of the steering system. Based on the evaluation result of the evaluator, the operation mode of the controller is set.

Figure 2:
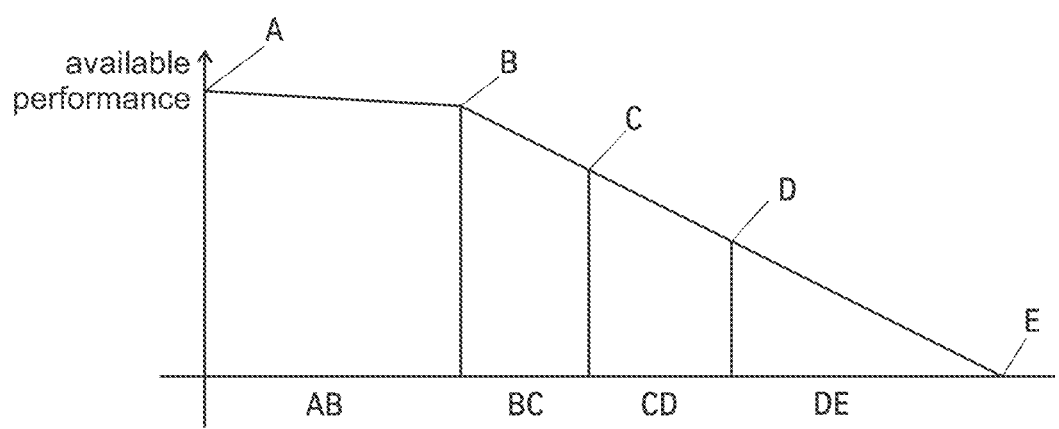
FIG. 2 is a diagram of performance degradation of the steering system.

FIG. 2 shows the four operation modes (AB,BC,CD,DE) of the controller of the safety critical steering system in terms of available performance of the steering system.

A, B, C, D, E represent available performance limit values. AB, BC, CD, DE represent the various modes of operation which are defined by the sections between the performance limit values, respectively.

Operation mode AB is the normal mode. The available performance of the steering system is so high, that all driving maneuvers can be carried out and there are no limitations. A equals 100% of available performance, B is in a range between about 90% and about 99% of available performance, preferably B is about 95%, for example.

Operation mode BC is a first degraded mode with degraded operation; all driving maneuvers are possible but quality problems may occur, namely that the driver can feel a small delay in vehicle movement compared to steering wheel movement, which is not safety critical. C is in a range between about 60% and about 90% of available performance, preferably at about 70%, for example.

An information output unit is used to notify the driver of the degraded operation. The information output unit controls at least one notifier. The notifier may be, for example, a vehicle display or a speaker. A steering wheel can also be used to give feedback, for example, by vibration or by modifying a virtual gear ratio of a steer-by-wire steering system or by increasing the feedback given by a feedback actuator of a steer-by-wire steering system. The aforementioned examples of notifiers can also be combined.

The driver is thus warned by the notifier and can then decide to immediately park the car and call a towing service or to drive to a repair shop to fix the problem.

Operation mode CD is a second degraded mode with degraded operation; all driving maneuvers are possible but quality problems may occur. D is in a range between about 30% and about 70% of available performance of the steering system, for example. In order to maintain full vehicle controllability, the vehicle is forced to travel within a predetermined vehicle speed range with a speed limit.

Such a medium vehicle speed allows to prepare for further degradation of the steering system, for example, loss of function of a road wheel actuator.

Feedback is given to the driver to warn of the degraded operation mode of the steering system as described above.

The fourth operation mode DE is a third degraded mode functioning as an emergency mode. E equals zero available performance. Steering functionality is lost because the performance is too low to provide steering functionality. The vehicle is forced to travel within a predetermined vehicle speed range with a speed limit allowing to safely stop the car without steering. Further, it can be implemented that the system provides information about its degradation state and a vehicle level external actuator (e.g., drivetrain and/or brake) can help to control the vehicle lateral motion.

Feedback is given to the driver to warn of the emergency mode of the steering system. The feedback can be given as described above.

The described concept of several operation modes can be used in all steering systems where the system operation is safety critical. The operation does not need to be necessary fault tolerant. In the case that the system is not fault tolerant but the probability of the first fault is a low enough value that can be accepted in terms of safety issues, the concept can be used as well.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A steer-by-wire steering system for a motor vehicle or a steering system for an autonomous driving motor vehicle, the steering system comprising:
   a controller configured or programmed to control steering of steerable road wheels depending on a driver's input or an input of an autonomous driving unit, and to include operation modes including a normal mode of operation with full steering functionality and no quality problems, a first degraded mode with degraded operation of the steering system, a second degraded mode with degraded operation of the steering system, and a third degraded mode with degraded operation of the steering system; and
   an evaluator to evaluate a state of performance degradation of the steering system and to set one of the operation modes to be used by the controller based on an evaluation result from the evaluator; wherein
   the operation modes each correspond to specific ranges of percentages of a performance limit of the steering system;
   the normal mode of operation is in a range between 100% of available performance of the steering system and a first lower limit;
   the first degraded mode is in a range between a first upper limit and a second lower limit;
   the second degraded mode is in a range between a second upper limit and a third lower limit;
   the third degraded mode is in a range between a third upper limit and zero available performance of the steering system;
   the first degraded mode provides full steering functionality;
   the second degraded mode provides full steering functionality, and the controller of the steering system is configured or programmed to provide a vehicle speed limitation to a vehicle drive controller in the second degraded mode; and
   in the third degraded mode, the performance of the steering system is too low to finish the steering maneuvers, the vehicle speed limitation is set to allow the vehicle to safely stop without performance of the steering system while the steering system provides information about its degradation state, and a vehicle level external actuator is used to control lateral movement of the motor vehicle or the autonomous driving motor vehicle.

2. The steering system according to claim 1, wherein the first lower limit is in a range between about 90% and about 99% of the available performance of the steering system.

3. The steering system according to claim 2, wherein the first lower limit is about 95% of the available performance of the steering system.

4. The steering system according to claim 1, wherein the first upper limit is in a range between about 90% and about 99% of available performance of the steering system and the second lower limit is in a range between about 60% and about 90% of the available performance of the steering system.

5. The steering system according to claim 4, wherein the first upper limit is about 95% of the available performance of the steering system and/or the second lower limit is about 70% of the available performance of the steering system.

6. The steering system according to claim 1, wherein the second upper limit is in a range between about 60% and about 90% of available performance of the steering system and the third lower limit is in a range between about 30% and about 70% of the available performance of the steering system.

7. The steering system according to claim 6, wherein the second upper limit is about 70% of the available performance of the steering system and/or the third lower limit is about 50% of the available performance of the steering system.

8. The steering system according to claim 1, wherein the third upper limit is in a range between about 30% and about 70% of available performance of the steering system.

9. The steering system according to claim 8, wherein the third upper limit is about 50% of the available performance of the steering system.

10. The steering system according to claim 1, wherein the controller is configured or programmed to send its status to an information output capable of notifying a driver of a degraded operation.

11. The steering system according to claim 10, wherein the information output is configured or programmed to control at least one notifier, wherein the notifier includes at least one of a vehicle display, a vehicle speaker, a steering wheel, a modified virtual gear ratio of a steer-by-wire steering system, or an increased feedback provided by a feedback actuator of a steer-by-wire steering system.

12. The steering system according to claim 10, wherein the information output causes a tactile feeling to be provided on a steering wheel.

13. A method of controlling a steer-by-wire steering system for a motor vehicle or a steering system for an autonomous driving motor vehicle, the steering system including a controller configured or programmed to control steering of steerable road wheels depending on a driver's input or an input of an autonomous driving unit, and to include operation modes including a normal mode of operation with full steering functionality and no quality problems, a first degraded mode with degraded operation of the steering system, a second degraded mode with degraded operation of the steering system, and a third degraded mode with degraded operation of the steering system, the method comprising:
   evaluating a state of performance degradation of the steering system by evaluation to provide an evaluation result; and
   setting the controller to the normal mode or to one of the at least two degraded modes based on the evaluation result; wherein
   the operation modes each correspond to specific ranges of percentages of a performance limit of the steering system;
   the normal mode of operation is in a range between 100% of available performance of the steering system and a first lower limit;
   the first degraded mode is in a range between a first upper limit and a second lower limit;
   the second degraded mode is in a range between a second upper limit and a third lower limit;

the third degraded mode is in a range between a third upper limit and zero available performance of the steering system;

the first degraded mode provides full steering functionality;

the second degraded mode provides full steering functionality, and the controller of the steering system is configured or programmed to provide a vehicle speed limitation to a vehicle drive controller in the second degraded mode; and in the third degraded mode, the performance of the steering system is too low to finish the steering maneuvers, the vehicle speed limitation is set to allow the vehicle to safely stop without performance of the steering system while the steering system provides information about its degradation state, and a vehicle level external actuator is used to control lateral movement of the motor vehicle or the autonomous driving motor vehicle.

14. The method according to claim 13, wherein the first lower limit is in a range between about 90% and about 99% of the available performance of the steering system.

15. The method according to claim 14, wherein the first lower limit is about 95% of the available performance of the steering system.

16. The method according to claim 13, wherein the first upper limit is in a range between about 90% and about 99% of available performance of the steering system and the second lower limit is in a range between about 60% and about 90% of the available performance of the steering system.

17. The method according to claim 16, wherein the first upper limit is about 95% of the available performance of the steering system and/or the second lower limit is about 70% of the available performance of the steering system.

18. The method according to claim 13, wherein the second upper limit is in a range between about 60% and about 90% of available performance of the steering system and the third lower limit is in a range between about 30% and about 70% of the available performance of the steering system.

19. The method according to claim 18, wherein the second upper limit is about 70% of the available performance of the steering system and/or the third lower limit is about 50% of the available performance of the steering system.

20. The method according to claim 18, wherein the second degraded mode includes providing full steering functionality by the controller and providing the vehicle speed limitation in a range between about 40 km/h and about 130 km/h.

21. The method according to claim 13, wherein the third upper limit is in a range between about 30% and about 70% of the available performance of the steering system.

22. The method according to claim 21, wherein the third upper limit is about 50% of the available performance of the steering system.

23. The method according to claim 13, wherein in all of the first degraded mode, the second degraded mode, and the third degraded mode, the controller is configured or programmed to send its status to an information output capable of notifying a driver of a degraded operation by providing a notification including a tactile feeling on a steering wheel.

* * * * *